Figure 1:
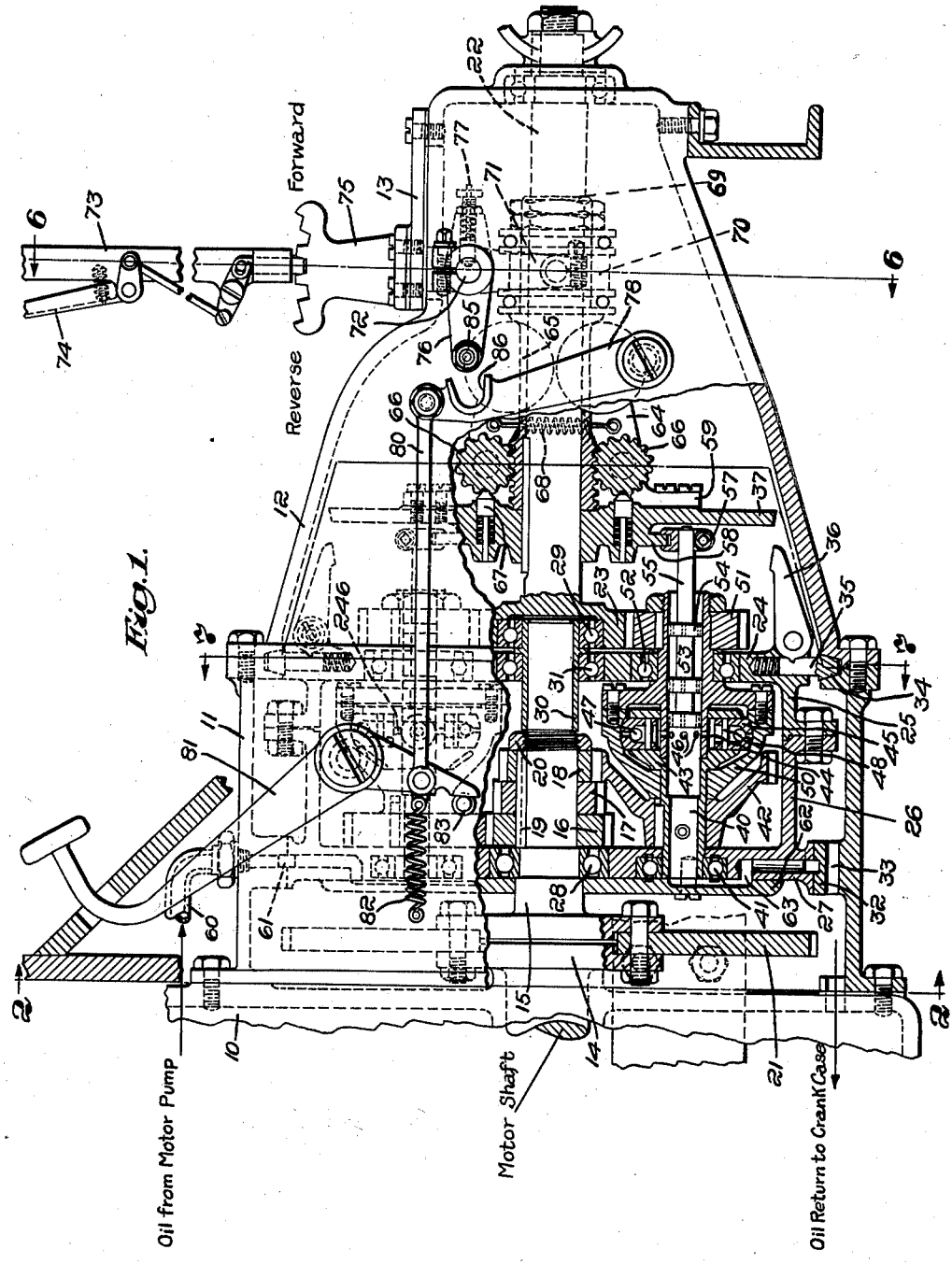

Oct. 1, 1940.  B. T. LEVEQUE  2,216,294
TRANSMISSION MECHANISM
Filed April 22, 1939   5 Sheets-Sheet 3
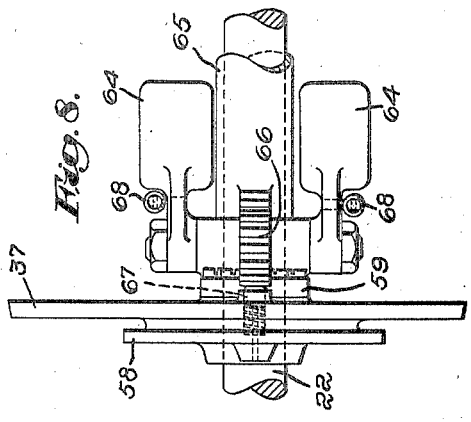
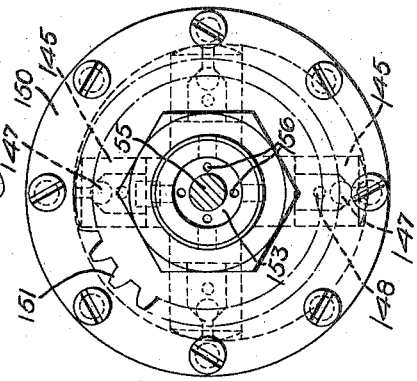
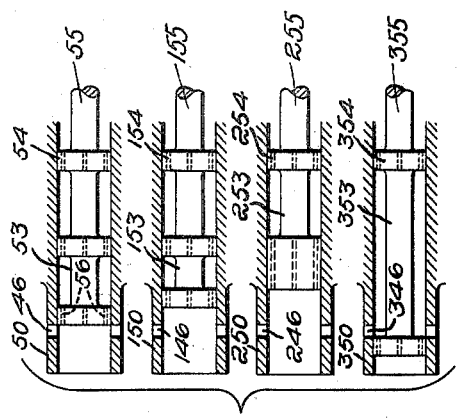
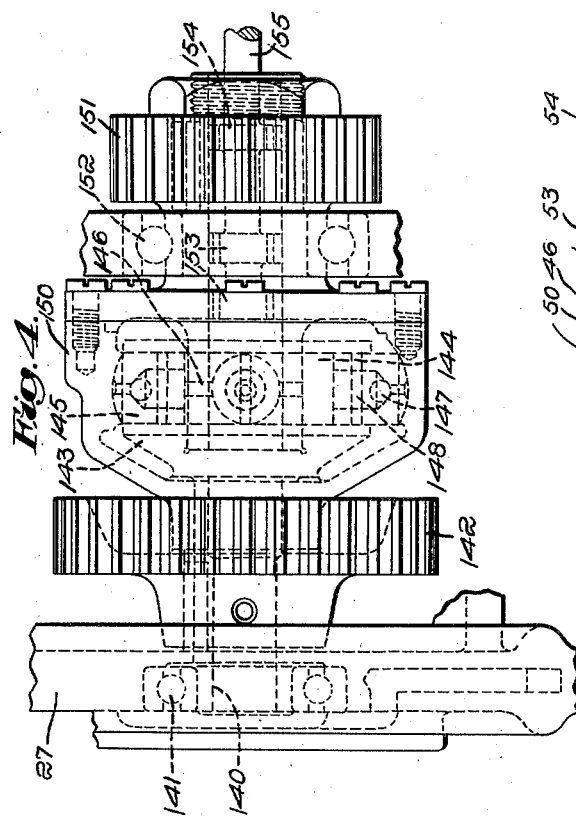
Inventor:
Bernard T. Leveque.
By Henway & Witter
Attorneys

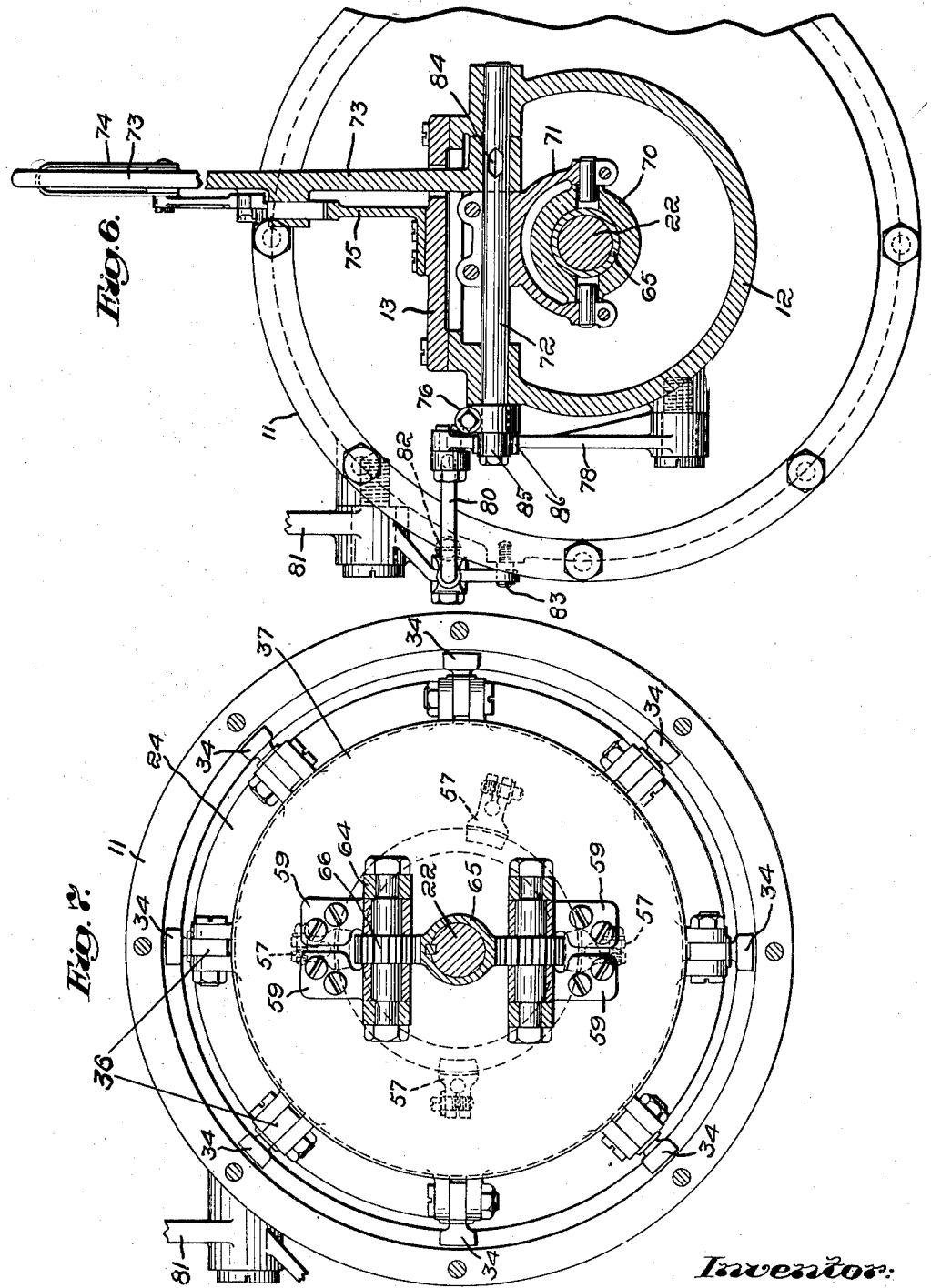

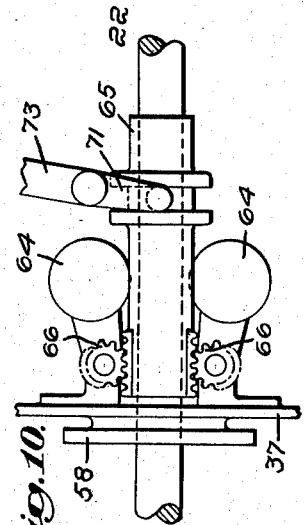
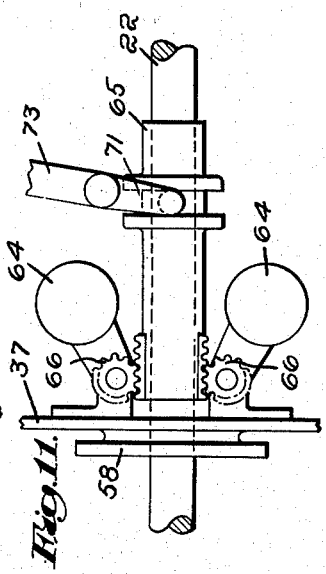
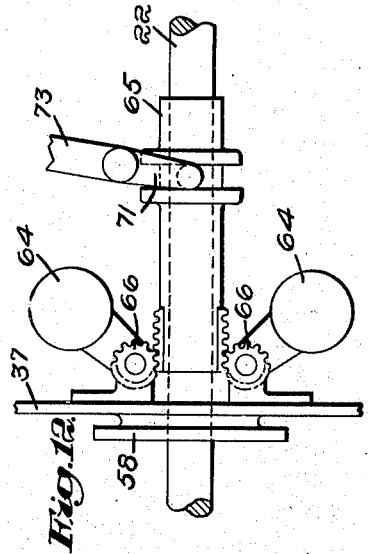
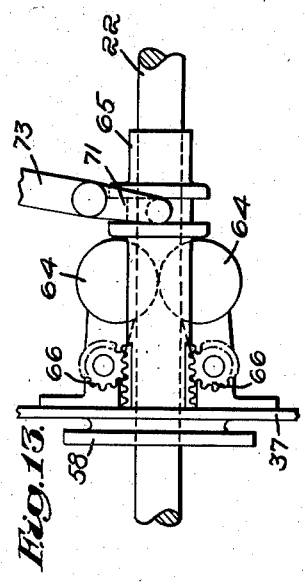
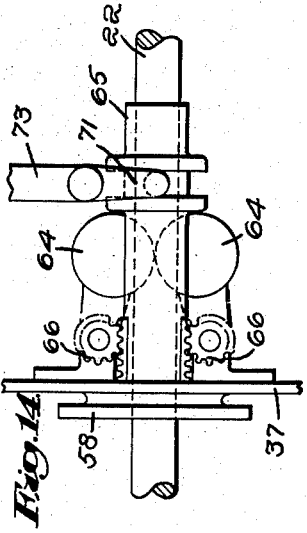
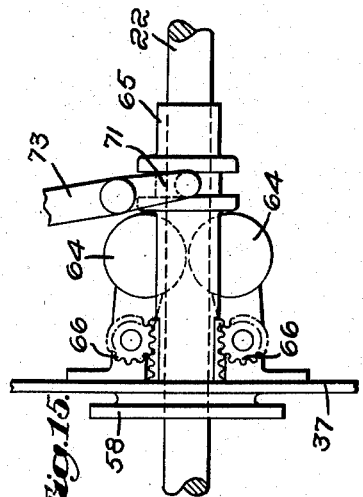

Patented Oct. 1, 1940

2,216,294

UNITED STATES PATENT OFFICE 2,216,294

TRANSMISSION MECHANISM

Bernard T. Leveque, Wenham, Mass.

Application April 22, 1939, Serial No. 269,389

16 Claims. (Cl. 74—294)

This invention relates to transmission or gear shift mechanism for internal combustion engines and consists in a new and improved mechanism characterized by the employment of a plurality of hydraulic clutch elements through which different speeds and reverse motion is transmitted from the engine to the driven shaft of the organization. In general the mechanism of my invention is designed to be incorporated in present standard automobile construction. Its construction is such that it takes up less room than transmission mechanism heretofore available, being particularly compact and being self-contained in the sense that it develops no unbalanced transverse or longitudinal thrusts. The mechanism herein shown is automatically controlled so that the proper gear train is thrown into operation in accordance with the speed at which the driven member is revolving, although provision is made whereby the driver may at any time reassert driver control. It also may serve as a limiting governor, interrupting the driving connection at a predetermined speed limit.

The mechanism of my invention is further characterized by a series of valve-controlled hydraulic clutches interposed between the gears of a graduated series and the driven member of the organization, together with means normally maintaining all of said clutches disengaged, and a valve controlling governor for selectively rendering effective one or another of said clutches in accordance with the speed of the driven member.

As herein shown the hydraulic clutches are mounted upon a rotary carrier member which is locked in stationary position for low and intermediate speeds and reverse drive but which may be released and permitted to revolve with its clutches as a unit for high speed.

Each of the hydraulic clutches is controlled by a balanced valve requiring only a slight amount of power for shifting it so that light movement only is required in controlling the mechanism for all speeds.

The construction of the individual hydraulic clutch units constitutes an important feature of my invention. Each includes symmetrically arranged cylinders rotating in a balanced organization and provided with short throw pistons acting directly to pump oil or other fluid into or expel it from the cylinders while the clutch is disengaged. The clutch is caused to become engaged by movement of an axially arranged valve which prevents piston movement by closing the ports of the cylinders.

In hydraulic clutches of the general type employed herein much difficulty has been encountered by reason of the tendency of air to become trapped in the cylinders of the clutch. This danger is obviated in accordance with the present invention by the provision of a valve-controlled air vent in each piston, and by the forced circulation of oil throughout the system, with the result that the clutch action is prompt and reliable at all times, both in continuous running and after periods of standing at rest.

As herein shown the mechanism of my invention is designed to drive at high speed, low speed, either of two intermediate forward speeds or one low speed reverse. The individual clutch units are not utilized in the high speed driving train but merely rotate bodily at engine speed within a carrier member. Novel means are provided for locking the carrier except when it is desired to operate at high speed. Novel means are also provided for selectively engaging the individual clutch appropriate for the desired operation of the mechanism. As herein shown the valves of all the clutches are related to a common valve-controlling device by connections of different lengths so that, in the continuous movement of the said device in one direction, the clutches are caused to become engaged and disengaged in the required order.

Figure 2:
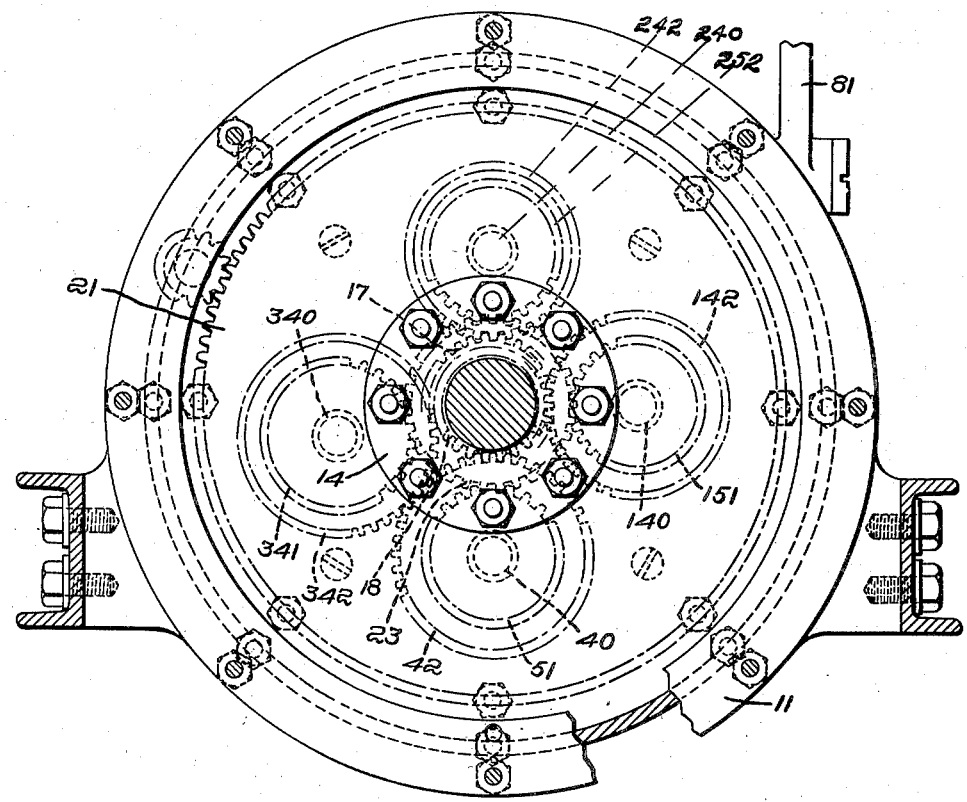
Figure 3:
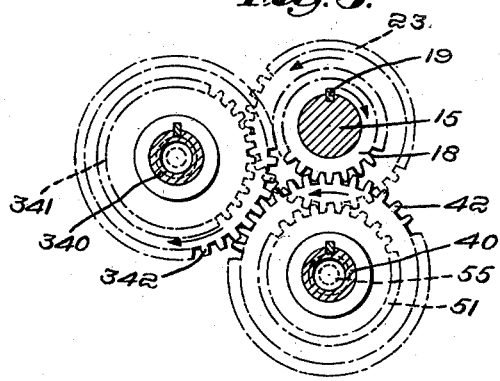

These and other features of my invention will be best understood and appreciated from the following description of a preferred embodiment thereof, selected for purposes of illustration and shown in the accompanying drawings, in which Fig. 1 is a view of the complete mechanism, partly in side elevation and partly in longitudinal section, Fig. 2 is a view in front elevation on the plane 2—2 showing the location of the gears, Fig. 3 is a reverse gear diagram, Fig. 4 is a plan view on an enlarged scale of one of the hydraulic clutch units, Fig. 5 is a corresponding view in end elevation, Fig. 6 is a sectional view on the line 6—6 of Fig. 1, Fig. 7 is a sectional view on the broken line 7—7 of Fig. 1, the outer casing being omitted, Fig. 8 is a plan view of the governor, and Fig. 9 is a diagrammatic view showing the relative positions of the clutch-operating valves when the controlling mechanism is in its neutral position, Figs. 10-15 inclusive show diagrammatically the operation of the governing mechanism under different conditions.

The mechanism is shown as installed upon the chassis of an automobile immediately in the rear of the motor crank case 10, that is, the front or forward end of the mechanism is shown at the left in Fig. 1. The terms forward and rear are employed in that sense in the following description.

The transmission casing comprises a flanged cylindrical portion 11 bolted to a conical portion 12 provided with a shoulder having a cover plate 13 in which is mounted a gear shift lever mechanism.

The motor shaft extends rearwardly into (to the right in Fig. 1) the transmission casing where it is provided with a flange 14 and a flanged extension 15 between which is clamped a starting gear 21. The motor shaft extension 15 is reduced in diameter and carries a graduated series of gears 16, 17 and 18 which are keyed thereto by a common key 19 and are held in place by a nut 20 threaded upon the part 15 of the shaft. The smallest gear 18 of the series is the driving gear for the low speed train and is also employed in the reverse gear train. The gear 17 is the driving gear in the second speed intermediate gear train, and the largest gear 16 is the driving gear in the third speed intermediate gear train. For high speed the gears 16, 17 and 18 are not used, but the rotation of the motor shaft is transmitted direct to the driven shaft as will be presently explained.

The driven shaft 22, carrying at its forward or inner end a gear 23 by which it is driven, is journaled in ball bearings in the rear end of the transmission casing 12. Within the cylindrical portion 11 of the casing is provided a rotary carrier comprising a rear face disk 24, cylindrical portions 25 and 26, which are flanged and bolted together, and a front face disk 27. In this carrier and between the disks 24 and 27 are mounted four similar but independent hydraulic clutches and the gear trains for three forward and one reverse speed drives, all including the gear 23 as the final gear of each train. The front disk 27 is journalled upon the motor shaft extension 15 by ball bearings 28. A flanged bushing 30 surrounds the rear end of the shaft 15 and extends rearwardly into bearing 29 to support the forward end of the driven shaft 22. This bushing rests in two sets of ball bearings one set 29 being mounted in the hub of the gear 23 and the other set 31 being mounted in the rear face disk 24 of the rotary carrier and its flange serves as a spacing washer to separate these two bearings. It will be seen therefore that the entire cylindrical carrier is free to spin freely on the bearings 28 and 31 about an axis coinciding with that of the motor shaft; also that the bushing 30 supports the inner end of the driven shaft, through the bearing 29.

The transmission casing 11 is provided with an internal flange or ring 32 which fits the circumference of the front disk 27 of the carrier with slight clearance and this flange is provided with a passage 33 or series of passages through which oil may find its way back toward the crank case. The adjacent flanges of the parts 11 and 12 of the transmission casing are shaped to provide an internal circumferential channel 34 having steeply tapered side walls. This channel is arranged to receive a series of locking plungers 35, one of which is shown toward the bottom of Fig. 1. Six or more of these plungers are mounted in the rear disk 24 of the carrier, each being normally projected into locking engagement with the walls of the channel 34 by a compression spring and each being connected to a retracting arm 36 pivotally mounted upon lugs projecting rearwardly from the flange 24. The arms 36 have inclined or cam faces at their rearward ends by which all the retracting arms may be engaged at the same time and swung outwardly to retract the locking plungers and free the carrier for rotation. This retracting operation is effected by a bevel edged disk 37 slidable axially upon the driven shaft 22 as will be presently explained. It will be noted that by reason of the sharp taper of the channel walls a very effective wedging lock is brought about between the carrier and the transmission casing. On the other hand, the arms 36 provide good leverage ratio for unlocking and this is supplemented by the wedging action of the beveled edge of the disk 37 upon the inclined faces of the arms so that the unlocking operation is facilitated.

I will now proceed to a description of the hydraulic clutch mechanism shown toward the bottom of Fig. 1, this being typical of the four similar clutches included in the transmission mechanism. A hollow clutch shaft 40 is rotatably mounted upon ball bearings 41 in the front flange 27 of the carrier and keyed to the shaft is a gear 42 which, as shown in Fig. 1, is driven by the smallest gear 18 of the graduated series rotating with the motor shaft extension, 15. Also integral with the hollow shaft 40 is a head 43 having four radially disposed cylinders 44 formed therein each provided with a hollow piston 45. Ports 46 open inwardly from the inner end of each cylinder to the hollow center of the casing 50 which serves as a valve chamber. Each piston has a small vent through its outer end and this is at times closed by a ball valve 47 retained loosely in place by a transverse pin 48 in the piston. The gear 42 and the head 43 with its pistons constitutes the driving member of the clutch. The driven member of the clutch comprises a hollow casing 50 freely rotatable upon the shaft 40 and rigidly connected at its outer end to a gear 51 meshing with the gear 23. The casing 50 comprises two parts bolted together and forming an eccentric chamber enclosing the head 43. This chamber is formed to provide a hardened ring against which the outer ends of the pistons 45 are engaged and by which the pistons are forced inwardly as the head 43 is rotated within the chamber. The casing 50 is journalled in the rear flange 24 of the carrier by ball bearings 52. The rearward member of casing 50 has a forwardly projecting hollow hub, which enters a recess in the head 43 of shaft 40, and in this hub are located the ports 46.

The ports 46 are controlled by a piston valve 53 movable axially within the bore of the casing 50 which is continuous with the bore of the hollow shaft 40. The piston valve 53 has two circular flange members spaced apart longitudinally of the valve, and these are longitudinally perforated by re-equalizing ports 56 so that the valve may be balanced in the system and so moved without any substantial endwise pressure to cover or uncover the ports 46. A guide flange 54 is provided on the valve stem 55 near the outer end of the bore. It will be apparent that as the valve 53 is moved to the left in Fig. 1 the ports 46 will be first closed by one flange of the valve, then opened when its reduced portion is moved into line with them, and then closed again by the second flange of the valve.

The hydraulic clutch shown at the bottom of Fig. 1 is in train with the low forward speed drive of the mechanism. The gear 17 operates a similar clutch located on a level with and in front of the shaft 14 in Fig. 1 and shown in Figs. 4 and 5. This clutch is in train with the second forward speed drive of mechanism. It includes in its structure a hollow shaft 140 rotatably mounted between flanges 24 and 27 of the carrier and having a gear 142 which is in mesh with the driving gear 17. The hollow shaft 140 also has a cylinder-carrying head 143 and pistons 145 enclosed by an eccentric driven casing 150 having the gear 151 meshing with the gear 23 on the driven shaft. The other elements of this particular clutch are designated by reference characters 146—147, 148, etc., similarly to the notation used in describing the low speed clutch of Fig. 1.

The four valve stems 55, 155, 255 and 355 extend rearwardly from their respective valves, terminating in shoe segments 57 having annular recesses within which a flange 58 may rotate freely. The flange 58 is integral with disk 37, on the driven shaft, and is formed on its forward face. It will be seen that longitudinal motion of disk 37 in either direction along the driven shaft will be imparted to all valve stems by these shoe segments, which are adjustably clamped to their respective valve stems. The length of the valve stems and the position of the valve bodies is such that as longitudinal motion is imparted to the valve operating disc 37 by the centrifugal governor to be described, each individual valve is closed in succession, and again opened as the next adjacent valve in the intermediate speed trains is closed.

Piston valves 53 and 153 have, as described, a second flange rearward of the first, shown diagrammatically in Fig. 9, and it will be noticed that the flange of valve 253 is substantially wider than on valves 53 and 153. These are so disposed that when the controlling disk 37 has moved forward so that ports 246 are completely closed, any further forward motion will bring the second flanges on valves 53 and 153 into positions to close ports 46 and 146, while ports 246 will remain closed because of the wider face on valve 253. In this position of the controlling disk, which corresponds to a car speed where direct drive should occur, the clutches of the intermediate gear trains are all engaged, thus forcing the whole carrier mechanism to rotate as a locked system. Such rotation is permitted by the release of locking plungers 35, which are drawn inwardly by the retracting arms 36, whose rearward ends are forced outwardly by the bevelled edge of the controlling disk 37 when in this position. If still further forward motion of disk 37 occurs, the valve flanges just described will move beyond their ports, thus releasing all clutches and severing all driving connection between driving and driven shafts. The rearmost edges of all valve flanges are therefore so located that this will occur simultaneously, thus serving as a limiting governor at a predetermined top speed beyond which no further acceleration can occur.

The gear 16 operates a third hydraulic clutch located above the shaft 15 in Fig. 1 and indicated also in Fig. 2. The clutch operates the third speed forward gear train of the mechanism. It includes in its structure a hollow shaft 240 rotatably mounted in flanges 24 and 27 of the carrier, this shaft being keyed to gear 242, which is in mesh with the driving gear 16. The hollow shaft 240 also has a cylinder-carrying head 243 and pistons 245 enclosed in an eccentric casing 250 having a gear 252 meshing with the gear 23 on the driven shaft 22.

The small gear 18 not only operates the low forward speed drive train of the mechanism, but also the reverse drive gear train, and in this drive is included the fourth hydraulic clutch of the series, having a hollow shaft 340 rotatably mounted in the flanges 24 and 27 of the carrier, similarly to those of the other clutch assemblies. This clutch is located behind the shaft 15 as seen in Fig. 1, its position being indicated in Fig. 2, and the arrangement of the reverse gear train in Fig. 3. It will be understood from the foregoing description that all four hydraulic clutches are mounted in the same transverse zone of the mechanism. They are located at equal radial distances from the driving shaft 15 and are spaced upon opposite sides thereof, although their arrangement is not quite symmetrical as shown in Fig. 2.

Gear 42, which is part of the low speed forward assembly, also serves as an intermediate gear in the reverse drive gear train, to give rotation in the opposite direction to gear 342 with which it meshes. Gear 342 is keyed to the hollow shaft 340, with which it forms the driving element of the clutch, similarly to gear 42 in the low speed drive train and gear 142 in the second forward speed drive train. The clutch mechanism itself is identical to those already described in connection with the low and intermediate drives. The driven member of the clutch includes a gear 341 which meshes with the driving gear 23 of the driven shaft, but which, when its clutch is engaged, will rotate it in the opposite direction from the other clutches, because of the inclusion in its train of gear 42, as already explained.

Fig. 9 is a diagrammatic view showing the position of the piston valves 53, 153, 253 and 353 in their respective valve chambers in the bores of the rear members of the casings 50, 150, 250 and 350 respectively, when the controlling disk 37 is in its neutral position. It will be seen that any forward motion of the controlling disk, which carries all valves with it, will first cause the valve 53 to close ports 46, thus engaging the clutch in the first speed forward gear train. As acceleration causes further forward motion of the controlling disk, the ports 46 are opened, and the ports 146 in the second forward speed gear train clutch are closed. Similarly, continued acceleration will open these ports 146 and close the ports 246 which will cause engagement of the clutch in the third speed forward gear train. It will be noted that valve 253 has one wide flange member to engage the ports, instead of two flanges as in the case of valves 53 and 153. Any further forward motion of the controlling disk from the position last described now brings the second flanges of valves 53 and 153 over their respective ports, and the wider flange of valve 253 still covers ports 246, so all forward intermediate speed clutches are engaged, and the carrier is forced to rotate bodily as a closed system, as elsewhere described. The rearward edge of the second flanges of valves 53 and 153 are in the same plane with the rearward edge of the flange of valve 253, so that if forward motion of the controlling disk beyond that described for direct drive should occur, all ports are opened, and all clutches rendered inoperative. The valve 353 which controls the clutch in the reverse drive gear train is disposed forward of its ports 346, so that this clutch is only engaged when the entire controlling mechanism is moved to the rear by manual control to be described.

Oil or other fluid under pressure is supplied to the hydraulic clutches from a motor driven pump through a pipe 60 which enters the top of the transmission casing as shown in Fig. 1. The oil then passes through a hole in flange 32 to an annular channel 61 formed partly in the stationary flange 32 and partly in the rotating front flange 27 of the carrier. This channel is connected by oil holes with a circular channel 63 formed in the forward face of flange 27, so that oil may flow freely into a chamber formed in the inner face of a cover plate 62 which is rigidly attached to the flange 27, and from thence into the open forward ends of the four hollow shafts 40, 140, etc.

I have found it to be important to guard against permitting air to be trapped anywhere in the hydraulic clutches since this would introduce an uncertain cushioning effect into the system. This danger is obviated by providing for a continuous flow of oil through the hollow clutch shafts 40, 140, etc., and for this reason the valve flanges are all provided with longitudinal passages which not only permit the desired flow of oil but insure balanced pressure on the valves.

In operation the pistons 45, 145, etc., are forced outwardly and maintained in contact with the eccentric ring of their respective casings by pressure of the oil behind them, as well as by centrifugal force due to their rotation about the clutch axis. So long as the ports 46 in any clutch are open, its pistons will reciprocate due to their contact with the eccentric casing ring, and the oil in each cylinder will simply pulsate through the open ports into the central space, and return. But when the ports are closed by the valve flanges, the oil cannot flow into this central space, the pistons therefore cannot move inwardly, so the eccentric casing is forced to rotate with the driving members and a substantially positive driving connection is established through that particular clutch. If the valve is moved in either direction to open the ports 46 slightly, the driving action is rendered less positive by the amount of slip or fluid transfer thus permitted, and if the ports are wide open no driving action results because the pistons are then free to reciprocate and the head carrying them can then rotate relative to the eccentric casing without obstruction.

I will now proceed to a description of the centrifugal governor, shown in Figs. 1, 8 and partly in Fig. 7. This governor automatically causes first one gear train and then another to come into operation by shifting the controlling disk 37 longitudinally on shaft 22, and so bringing first one clutch and then another into operation as already described. The controlling disk 37 is keyed to shaft 22 but is free to slide longitudinally upon it when so impelled by action of the governor. Two pairs of weighted arms 64 are mounted on short transverse shafts journaled in lugs 59 which are rigidly attached to disk 37, as shown in Figure 8. Pinions 66 are keyed in mid-position on the shafts of each pair of arms so as to rotate with them. These pinions engage rack teeth formed on a sleeve 65, which is keyed to shaft 22 and slidable along it.

Cooperating with each pinion 66 is a spring pressed, cone pointed plunger 67 mounted in the hub of the disk 37 and effective to register the pinions and therefore the disk itself in a predetermined series of spaced positions, that is, the pinions are yieldingly retained by the beveled plungers 67 in positions corresponding to the pitch distance between the teeth and these positions are determined with reference to the location of the ports 46 of the clutch valves. The governor arms are normally retracted by tension springs 68 and fly outwardly against the tension of these springs by centrifugal force when the driven shaft is rotated.

It will be seen that the action of this governor is to bring successively lower gear ratios into operation between the driving shaft 15 and the driven shaft 22 as acceleration in the latter is produced, or as the car gains in speed. Conversely if the car is slowed down by a steep hill or by closing the throttle, the gear ratio will be automatically stepped up. Because of the action of the spring plungers 67 the progression from one gear to another will not be uniform, but will proceed by quick changes; the resistance imposed by the plungers to governor action tending to retard or build it up until that resistance is overcome, and then to accelerate the movement to effect a shift of the valves to the next position quickly.

The sleeve 65, Fig. 6, has a rearwardly extending portion 69 in which is carried a shipper ring 70 mounted on trunnions between two thrust bearings. A forked shipper 71 as shown in Fig. 6 engages the ring 70 and is thus secured to a transverse shaft 72 journalled in the rear portion 12 of the transmission casing. A hand operated lever 73 is releasably secured to the shaft 72 by a cone pointed spring plunger 77 seated in its hub and engaging a beveled key seat 84. The hand lever 73 extends upwardly in convenient reach of the driver, and is provided with a locking lever 74 which controls a dog cooperating with a toothed segment 75 mounted on the cover plate 13. At the outer end of the cross shaft 72 is securely clamped a forwardly extending horizontal arm 76 having a roller 85 in its free end. Pedal operated mechanism is provided for engaging the arm 76 and holding it positively in neutral position. This comprises an arm 78 pivotally mounted upon one side of the casing 12 and having a tapering recess 86 near its upper end which is arranged to engage the roller 85 of the arm 76 when the arm 78 is moved rearwardly. At its upper end the arm 78 is connected through a rod 80 to the lower arm of a pedal lever 81 mounted thereon at one side of the casing 11. A tension spring 82 is connected to the short arm of the pedal lever and is effective to maintain the arm in its forward position in contact with a fixed stop 83 and the arm 78 held in its inoperative position as shown in Fig. 1. When the pedal lever 81 is depressed by the operator's foot, the arm 78 is swung rearwardly, and the sloping faces of the recess 86 engage the roller 85 in the arm 76 in whichever of its several positions it may be, and by the cam action of these sloping faces will return arm 76 to its central position. As the arm 76 is rigidly attached to shaft 72, the action just described will return the sleeve 65 to its neutral position, and thereby will move the controlling disk 37 and all valves to their next rearward position. If the hand lever 73 is in forward or reverse position when the pedal 81 is depressed, the cone-pointed spring plunger 77 will ride out of its bevelled seat 84, to permit the action by releasing the driving connection between the lever 73 and the shaft 72. The effect of thus moving the controlling disk 37 to its next rearward position from forward speeds is to shift to the next lower speed gear train. As this interposes a higher gear ratio between the engine and car speed, retardation will occur and successive shifts to lower speed trains will automatically take place by action of the governor, until the controlling disk 37 reaches its neutral position, and all clutches are disengaged.

If the pedal lever 81 is depressed while in reverse gear, sleeve 65 and with it the controlling disk 37 is moved forwardly into neutral position, thus disengaging the clutch in the reverse gear train. The bevelled seat 84 and the cone-pointed spring plunger 77 are so proportioned that they are not completely thrown out of contact when pedal lever 81 is depressed, but will reassert their relation when that pedal is released, so as to restore sleeve 65 to the position previously occupied, without having to pick it up again by the hand lever 73 to so restore it.

Figs. 10 to 15 inclusive show in outline the relative positions of the controlling mechanism under different conditions.

In Fig. 14 the car is at rest and the hand operating lever 73 is in neutral position.

In Fig. 13 the hand operating lever 73 has been pulled back to advance the controlling mechanism so that the first forward speed gear train clutch is engaged.

In Fig. 10, acceleration has generated sufficient centrifugal force to cause weighted arms 64 to fly out and advance controlling disk 37 so as to disengage the first forward speed gear train clutch and to engage the second forward speed gear train clutch.

In Fig. 11, further acceleration has similarly disengaged the second forward speed gear train clutch and has engaged the third forward speed gear train clutch.

In Fig. 12, yet further acceleration has advanced the controlling disk to the point where all forward speed gear train clutches are engaged, and direct drive results through bodily rotation of the whole carrier mechanism, which has been unlocked in this position as elsewhere described.

In Fig. 15, the hand operated lever 73 has been moved forward into reverse drive position, moving the controlling mechanism rearwardly so as to close the valve in the reverse drive gear train and so actuate it.

Having now described the various elements of this construction of my invention, I will proceed to describe its operation.

To start the car the operator simply releases and pulls back hand lever 73. By action of the fork 71 in the shipper ring 70, this advances the whole controlling mechanism along the shaft 22, so that the piston valve 53 closes the ports and makes operative the clutch in the low forward speed gear train. The operator has nothing further to do except to manipulate the throttle for the desired car performance. As the car gains speed centrifugal force will at the proper point overcome the resistance imposed by ratchet plungers 67 upon the teeth of the pinions 66, and the controlling disk 37 will snap forward to the next position, carrying with it the piston valves and this movement will disengage the clutch of the low speed forward gear train, and simultaneously engage that of the second speed forward gear train. Still further acceleration will similarly disengage the second, and engage the third speed forward gear train. Yet more acceleration will release the carrier so it may revolve as a whole, and will cause engagement of the clutches of all three forward speed gear trains, so that the carrier is forced to rotate as a closed system, giving a direct driving connection between the engine and the driven shaft 22 without interposition of any gearing whatever. If acceleration is sufficiently carried beyond this point, so that the predetermined top speed limit is exceeded, all clutches are disengaged and no further acceleration is possible. It will be noted that at high speed the transmission mechanism acts somewhat as a gyroscope tending to minimize any rocking action or tendency to get out of line. It will be understood, of course, that the mechanism as a whole is carefully balanced to compensate for the unsymmetrical location of the reversing clutch 340, 341, etc.

If the operator wishes to slow down, the same events occur in the reverse order, with the obvious advantage that successive interposition of higher gear ratios will have flexible and substantial braking effect, thus relieving the operator as well as saving wear on the braking system.

If the operator wishes to stop, the driving connection to the engine may be interrupted by either putting the hand lever in neutral position or by stepping on the pedal which will return the controlling mechanism to neutral irrespective of the hand lever. It will be noted that the transmission mechanism of my invention obviates the necessity of any separate main clutch mechanism. The space ordinarily required for the main clutch is thus saved and a very compact installation made possible.

In order to reverse, the hand lever is released and thrust forward, thus moving the controlling mechanism rearwardly along the shaft 22, and with it the valve which renders operative the clutch in the reverse gear train.

It will be noted that the valve of the reversing clutch 353 is under governor control and thus the vehicle is guarded against all possibility of excessive speed in reverse. Referring to Fig. 9 it is apparent that the reversing clutch is engaged when the valve 353 is advanced to close the port 346 by moving the lever 73 into reverse position. Action of the governor, however, tends to move this valve rearwardly and again uncover the port 346 if a predetermined safe speed of reverse is exceeded.

While the transmission mechanism of my invention has been described in connection with its application to internal combustion engine installations, it will be understood, of course, that it may be used wherever its action is desirable for any variable speed or torque transmission. It has the particular advantage in connection with motor vehicles that the operator is not required to learn new operating procedure but can continue to drive as in any commercial vehicle. Moreover, if desired, the automatic control of the mechanism may be eliminated and it may be operated under full manual control.

While the mechanism as herein illustrated is provided with a plurality of gear trains between the driving and driven members, chain and sprocket trains may be substituted if desired as equivalent mechanisms.

The hydraulic features of my invention make possible certain other advantages which I wish to emphasize. In the first place, the entire system is in only low oil pressure so that there is no appreciable tendency to lose oil when in operation and no need of tight fitting parts. On the other hand, there is always an ample supply of oil available in the system and its free circulation, as already explained, obviates all danger of cavitation. Moreover, the mechanism of my invention tends to confine the time of shifting from one speed to another to intervals of low torque. When the mechanism is transmitting high torque the hydraulic pressure upon the active controlling valve is transverse to its path of movement tending to retard valve movement in response to the yielding action of the governor. When, however, the vehicle has picked up sufficient speed to reduce the torque transmitted the transverse pressure upon the active valve is substantially reduced so that the effort of the governor which may have been previously inadequate to shift the valve now becomes effective to shift to a higher transmitting ratio.

Having thus disclosed my invention and described a preferred embodiment thereof I claim as new and desire to secure by Letters Patent—

1. Automatic transmission mechanism comprising a driving shaft having a graduated series of gears thereon, a shaft having a driven gear thereon, a hydraulic clutch mechanism located between each of said graduated gears and said driven gear, all of said clutches being mounted for bodily rotary movement in the same transverse zone of the mechanism, and means for selectively rendering one of said clutches effective.

2. Automatic transmission mechanism comprising a driving shaft having a graduated series of gears thereon, a shaft having a driven gear thereon, a valve-controlled hydraulic clutch interposed between each of said graduated gears and said driven gear, all of said clutches being mounted for bodily rotary movement in the same transverse zone of the mechanism, means normally maintaining all of said clutches idle, and a valve controlling governor for selectively rendering effective one or another of said clutches.

3. Automatic transmission mechanism comprising a driving shaft having a graduated series of gears thereon, a concentrically mounted carrier having hydraulic clutches which are respectively driven by said gears, a shaft having a driven gear in train with each of said clutches, means for locking the carrier arranged to be released at a predetermined speed of driven shaft, and means for selectively rendering one of said clutches effective while the carrier is locked at rest.

4. Transmission mechanism comprising a driving shaft having a graduated series of gears thereon, a driven shaft, hydraulic clutches one of which is interposed between each gear of the graduated series and the driven shaft and all of said clutches being mounted for bodily rotary movement in the same transverse zone of the mechanism, a controlling valve for each clutch, and means for delivering fluid from a common source to each of said clutches.

5. Transmission mechanism comprising a driving member having a graduated series of gears therein, a driven shaft, hydraulic clutches one of which is interposed between each gear of said series and the driven shaft and all of said clutches being mounted for bodily rotary movement in the same transverse zone of the mechanism, a series of valves located in offset relation to each other and arranged to control the respective clutches, and a common valve operating member.

6. Transmission mechanism comprising a driving member having a graduated series of gears therein, a driven shaft, hydraulic clutches one of which is interposed between each gear of said series and the driven shaft and all of said clutches being mounted for bodily rotary movement in the same transverse zone of the mechanism, a series of valves located in the mechanism in longitudinally stepped relation, one controlling each clutch, a longitudinally movable valve operating member, and independent connections between said member and the respective valves.

7. Automatic transmission mechanism comprising a driving member including a graduated series of gears, a driven shaft, a hydraulic clutch and a direct driving train interposed between each of the gears of said series and the driven shaft, a hydraulic clutch and a reverse driving train interposed also between one gear of the series and said driven shaft, all of said hydraulic clutches being mounted for rotary movement as a group in the same transverse zone of the mechanism, and means for rendering effective a selected clutch.

8. Automatic transmission mechanism comprising a driving member including a graduated series of gears, a driven shaft, a rotatable carrier having a plurality of hydraulic clutches thereon operated at different speeds by the respective gears of said series and having driving trains for operating the driven member, means for locking the carrier, automatic means for engaging a selected clutch, and means for simultaneously unlocking the carrier and engaging a plurality of said clutches.

9. Transmission mechanism comprising a driving member including a graduated series of gears, a driven shaft, a hydraulic clutch and driving train interposed between each gear of the series and said driven shaft, a separate controlling valve for each clutch, a movable valve-operating device, a governor actuated by said driven shaft and arranged to move said device, and means for registering the valve-operating device in a series of spaced predetermined positions as it is moved by the governor.

10. Transmission mechanism including a driving shaft, a driven shaft a plurality of hydraulic clutches and corresponding gear trains interposed between said shafts, a valve for controlling each clutch, a movable valve-operating device having connection with all of said valves for moving them simultaneously, a governor arranged to move said device, a toothed disk rotated by the governor, and a detent for registering said disk and valve-controlling device in positions corresponding to predetermined valve settings.

11. Transmission mechanism including a driving shaft, a driven shaft, a plurality of hydraulic clutches interposed between said shafts, arranged side-by-side and having controlling valves movable axially of the clutches and in parallel relation, a valve-operating disk movable under governor control, a ring connected to said disk and having a separate connection with each clutch such that a single selected valve only is caused to become engaged as the disk is shifted by governor action.

12. Transmission mechanism including a driving shaft, a driven shaft, a plurality of hydraulic clutches interposed between said shafts and arranged in a circle and having controlling valves movable axially of the clutches, a disk disposed concentrically with respect to said circle and movable toward and from the clutches, and connections of different effective lengths between the individual valves on the one hand for moving all the valves simultaneously and said disk on other hand.

13. Automatic transmission mechanism comprising a driving shaft having graduated gears thereon, a driven shaft, separate trains of mechanism interposed between said graduated gears respectively and said driven shaft and each including a hydraulic clutch, a movable controlling valve associated with each clutch, delayed action means for simultaneously shifting said valves with a snap action.

14. Automatic transmission mechanism comprising a driving shaft having graduated gears thereon, a driven shaft, an interposed rotary carrier having separate trains between said graduated gears respectively and said driven shaft and each including a hydraulic clutch engageable to render its train effective, a movable controlling valve associated with each train, and a governor controlled device for causing said valves all to close at a predetermined and relatively high speed for directly connecting the driving and driven shafts through said rotary carrier and for causing said valves to open by further movement to interrupt driving connection at speeds in excess of a predetermined figure.

15. Transmission mechanism including a driving shaft, a driven shaft, a plurality of speed-changing gear trains interposed between said shafts and each having a hydraulic clutch controlled by a sliding valve subject to pressure transverse to its path of movement and tending to retard valve movement when the clutch is transmitting substantial torque, and centrifugal mechanism for shifting said valves subject to the delay caused by such pressure thereon.

16. Automatic transmission mechanism comprising a driving shaft and a driven shaft, one having a graduated series of gears thereon, spaced disks rotatable with the driving shaft, a series of hydraulic clutches carried by said disks in different radial positions about the driving shaft, a gear train between each hydraulic clutch and one of the gears of the graduated series, and automatic means for selectively rendering effective one or another of said clutches.

BERNARD T. LEVEQUE.